United States Patent [19]

Iwata et al.

[11] Patent Number: 4,936,137

[45] Date of Patent: Jun. 26, 1990

[54] PRESSURE DETECTING APPARATUS

[75] Inventors: Toshio Iwata, Himeji; Satoru Ohkubo, Amagasaki, both of Japan

[73] Assignee: Mitsubishi Denki K.K., Tokyo, Japan

[21] Appl. No.: 461,891

[22] Filed: Jan. 8, 1990

Related U.S. Application Data

[62] Division of Ser. No. 317,489, Mar. 1, 1989.

[30] Foreign Application Priority Data

Mar. 8, 1988 [JP] Japan ................................. 63-52718
Mar. 9, 1988 [JP] Japan ................................. 63-53798

[51] Int. Cl.[5] .......................................... G01M 15/00
[52] U.S. Cl. ...................................................... 73/115
[58] Field of Search ............... 73/115, 117.3; 123/425, 123/435

[56] References Cited

U.S. PATENT DOCUMENTS 4,556,030 12/1985 Aono ............................. 123/435 X
4,709,678 12/1987 Yagi et al. .......................... 123/425

*Primary Examiner*—Jerry W. Myracle
*Attorney, Agent, or Firm*—Sughrue, Mion, Zinn, Macpeak & Seas

[57] ABSTRACT

The present invention relates to a pressure detecting apparatus which detects the peak of combustion pressure in a cylinder of an internal combustion engine and the timing of that peak. The apparatus according to the present invention can be constructed in two alternative ways. That is, in one way, once stored data of combustion pressure in the cylinder is read out in reverse order, thus the difference between the read-out data and the data of combustion pressure in the cylinder is obtained, and the peak of combustion pressure in the cylinder and the timing of the peak are detected in accordance with the difference. In another way, the inflection points of the differentiated result of the data of combustion pressure in the cylinder are detected, and the peak of combustion pressure and the timing of the peak are detected in accordance with the inflection points. Consequently, the peak of combustion pressure in the cylinder and the timing of the peak can be detected easily even in the case where the internal combustion engine is idling and the peak of combustion pressure in the cylinder has comb to be less than the maximum pressure value of the motoring, for example. As a result, it is possible to accurately detect the combustion condition in the cylinder of the internal combustion engine.

3 Claims, 5 Drawing Sheets

PRESSURE DETECTING APPARATUS

This is a division of application Ser. No. 317,489, filed Mar. 1, 1989.

BACKGROUND OF THE INVENTION

1. Field of the Invention

The present invention relates to a pressure detecting apparatus which detects the peak of combustion pressure in a cylinder of an internal combustion engine and the timing of the peak.

2. Description of the Prior Art

FIG. 1 is a schematic view showing a conventional apparatus for detecting pressure in a cylinder. In the figure, numeral 20 denotes a pressure sensor which is mounted to an internal combustion engine (not shown in the drawings) and senses the combustion pressure in the cylinder, while numeral 21 denotes a conventional detecting device which detects the peak of combustion pressure in the cylinder and the timing of the peak. The waveform of combustion pressure in the cylinder detected by the pressure sensor 20 is inputted into the detective device 21, which detects the peak of the waveform ($P_{max}$) and the timing of the peak ($\theta_{pmax}$).

FIG. 2 shows graphs designating the size-relationship between the peak of combustion pressure ($P_1$ in the figure) and the motoring $P_{max}$ ($P_2$ in the figure), wherein the vertical line and the horizontal line denote pressures and crank angles respectively. Also in the figure, the point A on the horizontal line indicates the moment when the piston of the internal combustion engine has reached Top Dead Center (TDC). FIG. 2(*a*) shows the pressure waveform in the case where the peak of combustion pressure is greater than the motoring $P_{max}$, while FIG. 2(*b*) shows that in the case where the former is equal to or less than the latter.

When that relationship is represented by such a waveform as shown in FIG. 2(*a*), the peak of combustion pressure can be detected easily by means of the conventional apparatus because the peak of combustion pressure is greater than the motoring $P_{max}$. To the contrary, when the relationship is represented by such a waveform as shown in FIG. 2(*b*), that is, when the peak of combustion pressure is less than the motoring $P_{max}$, particularly in the case where the pressure waveform lacks the maximum value, there has been a trouble that it has been very difficult for the conventional apparatus to detect the peak of combustion pressure and the timing of the peak.

SUMMARY OF THE INVENTION

The present invention has been made in order to solve such a trouble as described above. In the pressure detecting apparatus, once stored pressure data in the cylinder is read out in reverse order, the peak-timing of the difference between thus read out data and the pressure data in the cylinder is detected as the peak-timing of combustion pressure (the timing of the peak), and the combustion pressure data at the peak-timing is detected as the peak.

In the pressure detecting apparatus of another embodiment according to the present invention, the inflection point timing of the differentiated result of the pressure data in the cylinder is detected as the peak-timing of combustion pressure (the timing of the peak), and the combustion pressure data at the peak-timing is detected as the peak.

A first object of the present invention is to provide a pressure detecting apparatus capable of easily detecting the peak of combustion pressure in the cylinder even in the case where the peak of combustion pressure in the cylinder is less than the motoring $P_{max}$.

A second object of the present invention is to provide a pressure detecting apparatus capable of easily detecting the timing of the peak of combustion pressure in the cylinder even in the case where the peak of combustion pressure in the cylinder is less than the motoring $P_{max}$.

A third object of the present invention is to provide a pressure detecting apparatus capable of accurately detecting the peak of combustion pressure in the cylinder and the timing of the peak even when the internal combustion engine is idling.

A fourth object of the present invention is to provide a pressure detecting apparatus capable of accurately detecting the combustion condition of the internal combustion engine.

The above and further objects and features of the invention will more fully be apparent from the following detailed description with accompanying drawings.

DESCRIPTION OF THE PREFERRED EMBODIMENTS

The present invention will be described with reference to the drawings showing the embodiments thereof.

Figure 1:
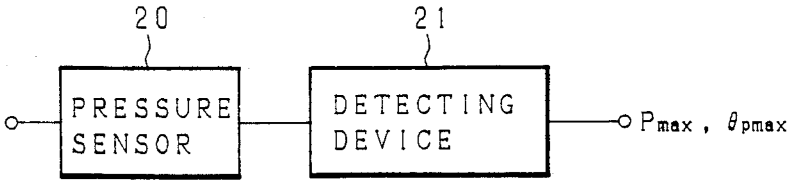
Fig. 1 Prior Art
FIG. 1 is a schematic view showing a conventional apparatus for detecting pressure in a cylinder.
Figure 2:
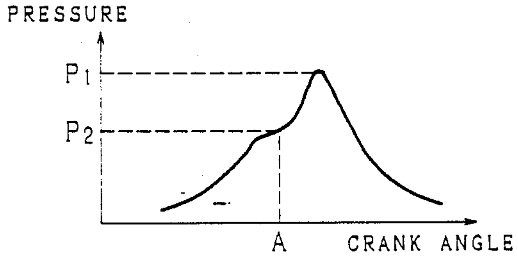
Fig. 2 (a) Prior Art
FIG. 2 (including parts a and b) shows graphs designating pressure waveforms in the cylinder of an internal combustion engine.
Figure 2:
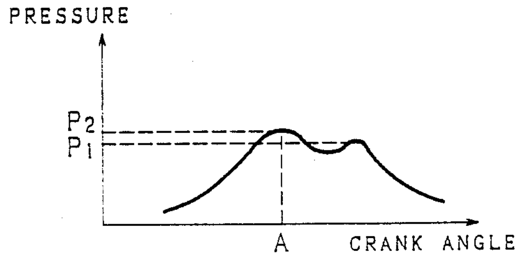
Fig. 2 (b) Prior Art
Figure 3:
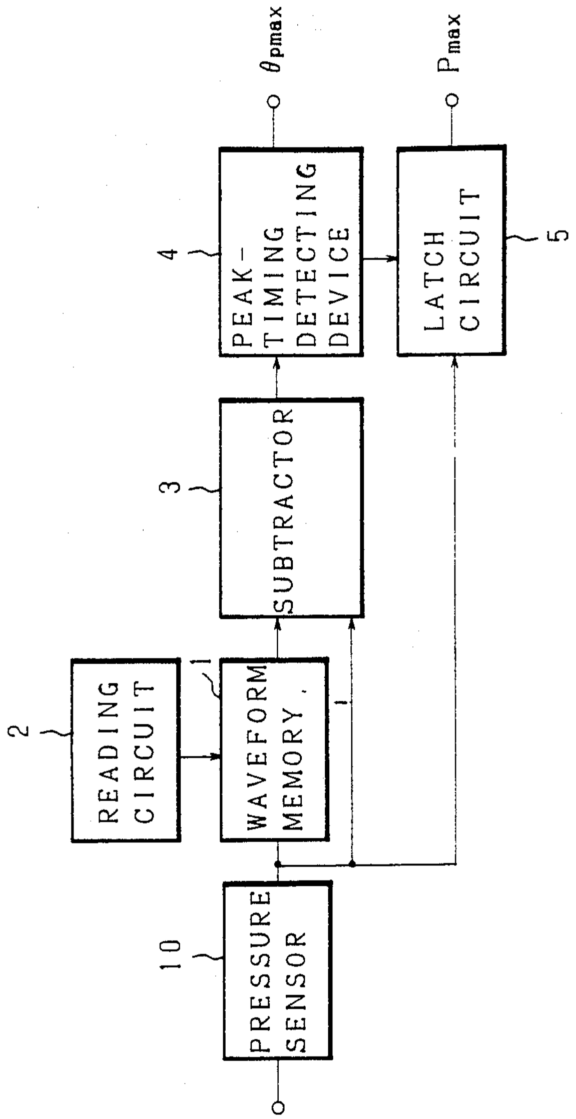
FIG. 3 is a block diagram showing an arrangement of a pressure detecting apparatus in a first embodiment of the present invention.

FIG. 3 is a block diagram showing an arrangement of an apparatus in a first embodiment of the present invention, wherein numeral 10 is a pressure sensor which is mounted to an internal combustion engine (not shown in the drawings) and senses the combustion pressure in the cylinder. Numeral 1 denotes a waveform memory in which the waveform of combustion pressure in the cylinder of an internal combustion engine is sequentially inputted and stored. By the reading circuit 2, the stored waveform is sequentially read out from the waveform memory 1 in reverse order to that of input. In this connection, the timing to start the reading-out is the moment when the piston of the internal combustion engine reaches TDC.

Numeral 3 denotes a subtractor. The waveform read out from the waveform memory 1 and the waveform of combustion pressure in the cylinder, the same waveform as that to be inputted into the waveform memory 1, are inputted into the subtractor 3, which subtracts both waves and outputs the waveform obtained as a result of the subtraction to a peak-timing detecting device 4. The peak-timing detecting device 4 detects the peak-timing of the inputted waveform and outputs this outwards as the timing of the peak ($\theta_{pmax}$), and simultaneously outputs a signal indicating this peak-timing to a latch circuit 5. The latch circuit 5 latches the waveform of combustion pressure in the cylinder synchronously with the signal indicating this peak-timing and outputs outwards the latched pressure as the peak of combustion pressure ($P_{max}$).

Figure 4:
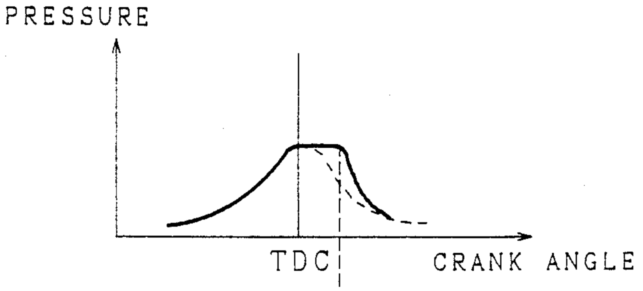
FIG. 4 (including parts a and b) shows graphs designating operation waveforms at some devices of the apparatus shown in FIG. 3.
Figure 4:
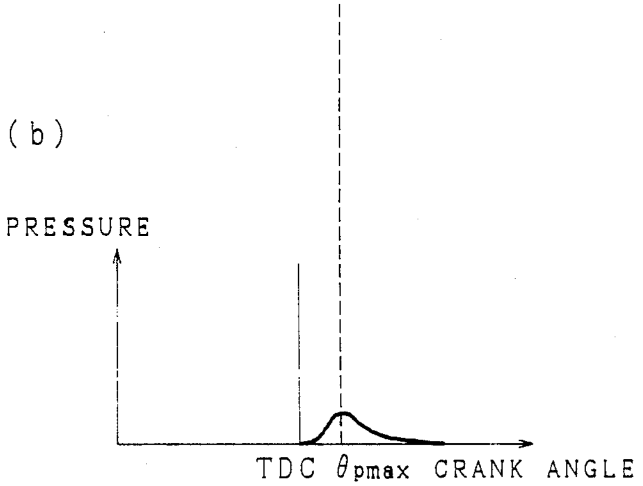

Next is given a description of the operations of the apparatus in the first embodiment of the present invention with reference to FIG. 4 designating operation waveforms of some devices.

The waveform of combustion pressure as designated in FIG. 4(*a*) is inputted into the waveform memory 1 from the pressure sensor 10 and once stored in the waveform memory 1. Then, from the moment when the piston of the internal engine has reached TDC, the waveform stored in the waveform memory 1 is read out by the reading circuit 2 in reverse order to that of input, and the read-out waveform is inputted into the subtractor 3. The waveform of combustion pressure in the cylinder, the same waveform as that to be inputted into the waveform memory 1, is also inputted into the subtractor 3. Then, both waveforms are subtracted by the subtractor 3 and such a waveform as shown in FIG. 4(*b*) is obtained, which is outputted to the peak-timing detecting device 4.

In accordance with this outputted waveform, the timing of the peak ($\theta_{pmax}$) is detected by the peak-timing detecting device 4. This timing is outputted to the latch circuit 5. The waveform of combustion pressure in the cylinder being latched by the latch circuit 5 at this timing, the peak of combustion pressure ($P_{max}$) is detected.

In this way, the combustion condition in the cylinder can be detected by detecting the peak of the combustion pressure ($P_{max}$) and the timing of the peak ($\theta_{pmax}$).

Figure 5:
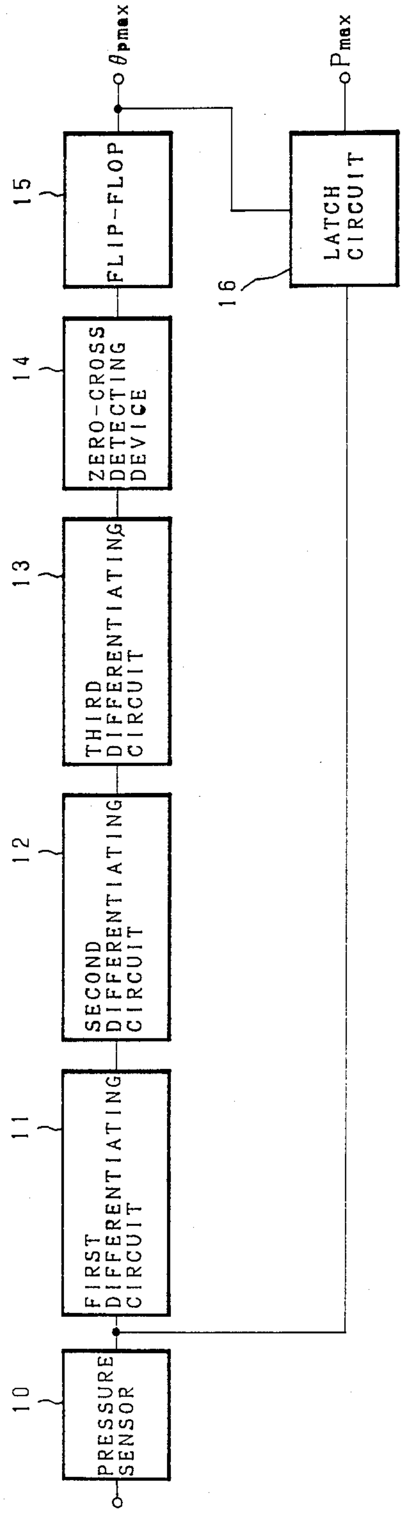
FIG. 5 is a block diagram showing an arrangement of a pressure detecting apparatus in a second embodiment of the present invention.

FIG. 5 is a block diagram showing an arrangement of an apparatus in the second embodiment of the present invention, wherein numeral 11 denotes a first differentiating circuit into which the waveform of combustion pressure in the cylinder of an internal combustion engine is inputted to be differentiated. To the first differentiating circuit 11, a second differentiating circuit 12 which differentiates the outputted waveform from the first differentiating circuit 11, a third differentiating circuit 13 which differentiates the outputted waveform from the second differentiating circuit 12, a zero-cross detecting device 14 which detects the zero-cross point of the outputted waveform from the third differentiating circuit 13 and an edge-trigger type flip-flop 15 which is triggered at the first rise-point after TDC among the detecting signals from the zero-cross detecting device 14 are connected in series in this sequence. In this connection, the second differentiating circuit 12, the third differentiating circuit 13 and the zero-cross detecting device 14 are component members to find the inflation points of the differentiated waveform of the waveform of combustion pressure. Numeral 16 denotes a latch circuit which latches the waveform of combustion pressure in accordance with the timing signal from the flip-flop 15.

Below is given a description of the operations of the apparatus in the second embodiment of the present invention with reference to FIG. 6 designating operation waveforms of some devices.

Figure 6:
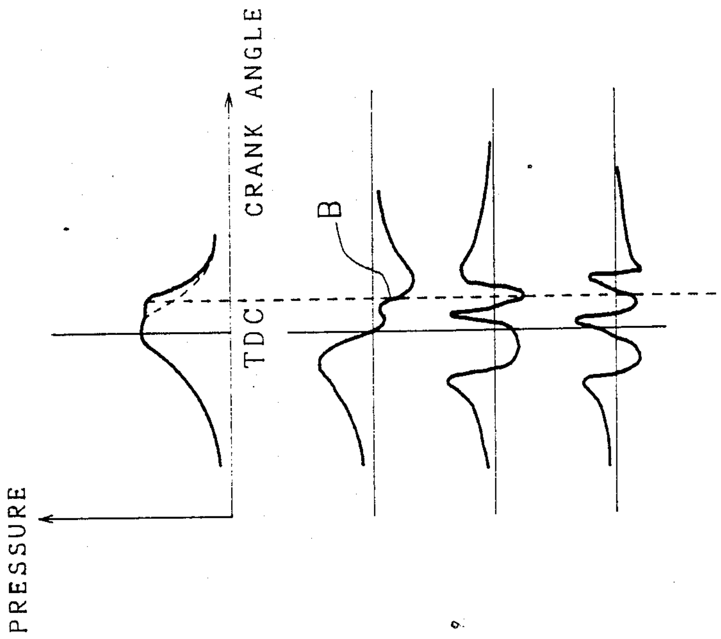
FIG. 6 (including parts a–d) shows graphs designating operation waveforms at some devices of the apparatus shown in FIG. 5.

Such a waveform of combustion pressure as shown in FIG. 6(*a*) is inputted into the first differentiating circuit 11 and differentiated. As a result, such an outputted waveform as shown in FIG. 6(*b*) is obtained. The inflection point B at the dropping time of the waveform as shown in FIG. 6(*b*) corresponds to the peak-timing of the pressure component due to the combustion. Then, the outputted waveform from the first differentiating circuit 11 is differentiated by the second differentiating circuit 12 and a waveform as shown in FIG. 6(*c*) is obtained. This waveform is further inputted into the third differentiating circuit 113 and differentiated to generate a waveform as shown in FIG. 6(*d*).

The zero-cross points of the waveform as shown in FIG. 6(*d*) are detected by the zero-cross detecting device 14. Among these detecting signals (zero-cross points), the first rise-point after TDC corresponds to the moment of the inflection point B at the dropping time of the wave form as shown in FIG. 6(*b*). Therefore, the flip-flop 15 is triggered at the moment of B and outputs outwards the detecting signal which is the timing of the peak ($\theta_{pmax}$). In accordance with this timing ($\theta_{pmax}$), the waveform of combustion pressure being latched by the latch circuit 16, the pressure at that timing is read and the peak of combustion pressure ($P_{max}$) is detected.

In this way, also in the apparatus in the second embodiment of the present invention, the peak of combustion pressure ($P_{max}$) and the timing of the peak ($\theta_{pmax}$) can be easily detected as well as in the first embodiment. As a result, it is possible to detect the combustion condition in the cylinder of an internal combustion engine.

At this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A pressure detecting apparatus which detects the combustion pressure in a cylinder of an internal combustion engine, comprising:
   - a pressure sensor for sensing the combustion pressure in said cylinder;
   - a first differentiating means for being inputted the data of combustion pressure in said cylinder from said pressure sensor and differentiating it;
   - an inflection point detecting means for detecting the inflection points of the differentiated result by said first differentiating means;
   - a timing detecting means for finding an inflection point where said differentiated result is dropping after TDC of the internal combustion engine among said inflection points and detecting the timing of said inflection point; and
   - a latch means for latching the combustion pressure in said cylinder at said timing outputted from said pressure sensor.

2. A pressure detecting apparatus as set forth in claim 1, wherein said inflection point detecting means comprises;
   - a second differentiating means for differentiating the differentiated result by said first differentiating means;
   - a third differentiating means for differentiating the differentiated result by said second differentiating means; and
   - a zero-cross detecting means for detecting the zero-cross point in the differentiated result by said third differentiating means.

3. A pressure detecting apparatus as set forth in claim 1, wherein said timing detecting means is an edge-trigger type flip-flop.

* * * * *